United States Patent
Zou et al.

(10) Patent No.: US 12,001,824 B2
(45) Date of Patent: Jun. 4, 2024

(54) APPLICATION PACKAGE SPLITTING AND REASSEMBLY METHOD AND APPARATUS, AND APPLICATION PACKAGE RUNNING METHOD AND APPARATUS

(71) Applicant: Petal Cloud Technology Co., Ltd., Guangdong Province (CN)

(72) Inventors: Xianjun Zou, Shenzhen (CN); Xingnan Wang, Shenzhen (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 293 days.

(21) Appl. No.: 17/418,115

(22) PCT Filed: Dec. 3, 2019

(86) PCT No.: PCT/CN2019/122519
§ 371 (c)(1),
(2) Date: Jun. 24, 2021

(87) PCT Pub. No.: WO2020/134893
PCT Pub. Date: Jul. 2, 2020

(65) Prior Publication Data
US 2022/0107796 A1    Apr. 7, 2022

(30) Foreign Application Priority Data

Dec. 25, 2018 (CN) .......................... 201811595300.3

(51) Int. Cl.
*G06F 9/44*       (2018.01)
*G06F 8/61*       (2018.01)
(Continued)

(52) U.S. Cl.
CPC ............ *G06F 8/61* (2013.01); *G06F 9/44505* (2013.01); *H04L 9/3236* (2013.01)

(58) Field of Classification Search
CPC ....... G06F 8/61; G06F 9/44505; H04L 9/3236
See application file for complete search history.

(56) References Cited

U.S. PATENT DOCUMENTS

| 10,977,049 | B2* | 4/2021 | Shi | .......... G06F 9/4416 |
| 2013/0145085 | A1* | 6/2013 | Yu | ......... G06F 12/0246 |
| | | | | 711/103 |

(Continued)

FOREIGN PATENT DOCUMENTS

| CN | 101655877 A | 2/2010 |
| CN | 101833464 A | 9/2010 |

(Continued)

OTHER PUBLICATIONS

Yutaka Kawai, Managing Large and Small Files in a Distributed System, 2011, pp. 1-6. https://ieeexplore.ieee.org/stamp/stamp.jsp?tp=&arnumber=5936622 (Year: 2011).*

(Continued)

*Primary Examiner* — Mongbao Nguyen
(74) *Attorney, Agent, or Firm* — Conley Rose, P.C.

(57) ABSTRACT

An application package splitting and reassembly method includes splitting a first application package into a main package and at least one sub-package; storing the main package and the at least one sub-package in a first file; and generating a second application package corresponding to the application, where the second application package includes a header and the first file. After receiving an original application package, a server automatically performs splitting and reassembly on the original application package to generate a complete new application package.

16 Claims, 11 Drawing Sheets

(51) Int. Cl.
*G06F 9/445* (2018.01)
*G06F 9/455* (2018.01)
*H04L 9/32* (2006.01)

(56) References Cited

U.S. PATENT DOCUMENTS

| | | |
|---|---|---|
| 2014/0129675 A1 | 5/2014 | Pang |
| 2014/0333947 A1* | 11/2014 | Robinson ............ G06F 3/1248 358/1.15 |
| 2016/0219024 A1* | 7/2016 | Verzun ..................... H04L 9/34 |
| 2016/0337724 A1 | 11/2016 | Graves |
| 2017/0206073 A1 | 7/2017 | Kirkpatrick et al. |
| 2017/0206106 A1 | 7/2017 | Twitchell, Jr. et al. |
| 2017/0364377 A1 | 12/2017 | Koller Jemio et al. |
| 2019/0235850 A1* | 8/2019 | Mukherjee ................ G06F 8/71 |
| 2019/0324733 A1* | 10/2019 | Lubyanskyy ............. G06F 8/76 |

FOREIGN PATENT DOCUMENTS

| | | | | |
|---|---|---|---|---|
| CN | 102281325 A | | 12/2011 | |
| CN | 103186399 A | | 7/2013 | |
| CN | 104035804 A | | 9/2014 | |
| CN | 104166576 A | | 11/2014 | |
| CN | 104991793 A | | 10/2015 | |
| CN | 108419006 A | | 8/2018 | |
| CN | 108509110 A | * | 9/2018 | .......... G06F 3/0481 |
| CN | 109814913 A | | 5/2019 | |
| KR | 20130103242 A | | 9/2013 | |
| WO | WO-2012167742 A1 | * | 12/2012 | ............... G06F 8/61 |
| WO | WO-2016023471 A1 | * | 2/2016 | ............. G06F 3/048 |

OTHER PUBLICATIONS

IP, Relocation Data Package—A method for packaging and restoring related data entities within different address spaces, 2013, pp. 1-3. file:///C:/Users/mnguyen4/Downloads/IPCOM000225858D%20(2).pdf (Year: 2013).*

SMPTE, Archive eXchange Format (AXF)—Part 1: Structure & Semantics, 2017, pp. 1-100. https://ieeexplore.ieee.org/document/7879152?source=IQplus (Year: 2017).*

Graphic Front End, "How to Use Subpackage Loading for Applet Programs," May 2019, URL:https://www.jb51.net/article/161742.htm, with an English Version, total 9 pages.

Park, K., et al., "Supporting Practical Content-Addressable Caching with CZIP Compression," Proceedings of The 2007 USENIX Annual Technical Conference : Jun. 17-22, 2007, Santa Clara, CA, USA, Berkeley, Calif. USENIX Association, US, Jun. 17, 2007, XP002568537, total 14 pages.

Hatchasu, C., "Java Simple Implementation of Large File Package Uploading to Server," May 2018, URL:https://blog.csdn.net/fransis/article/details/80340426, with an English Version, total 6 pages.

Yasskin., J., et al., "Web Packaging draft-yasskin-dispatch-web-packaging-00," Dispatch Internet-Draft, Jun. 30, 2017, total 10 pages.

Bhargava, M., et al., "An Efficient Reliable PUP-Based Cryptographic Key Generator in 65nm CMOS, " 2014 EDAA, total 6 pages.

* cited by examiner

APPLICATION PACKAGE SPLITTING AND REASSEMBLY METHOD AND APPARATUS, AND APPLICATION PACKAGE RUNNING METHOD AND APPARATUS

CROSS-REFERENCE TO RELATED APPLICATIONS

This is a U.S. National Stage of International Patent Application No. PCT/CN2019/122519 filed on Dec. 3, 2019, which claims priority to Chinese Patent Application No. 201811595300.3 filed on Dec. 25, 2018. Both of the aforementioned applications are hereby incorporated by reference in their entireties.

TECHNICAL FIELD

The present invention relates to the field of mobile application download technologies, and in particular, to an application package splitting and reassembly method and apparatus, and an application package running method and apparatus.

BACKGROUND

Currently, a new application form represented by WeChat applets emerges. The application form is similar to an Android installation package: There is an application package, which is installation-free and tap-to-run. To ensure that a user can use the application package as quickly as possible, some package splitting solutions are usually provided. This can ensure that the user does not have to download the entire application package before using the application package, and only needs to load a part of the application package to run the application package.

An existing package splitting solution is to split an application package into one main package and a plurality of sub-packages. However, this application package splitting is performed by a developer, which increases development costs of the developer. In addition, the developer needs to maintain the sub-packages obtained through splitting. If the splitting performed by the developer is inappropriate, the sub-packages are still comparatively large, which cannot meet the user's expectation of tap-to-run.

In addition, currently, after a server splits an application package into a main package and a plurality of sub-packages, a client first sends a download request to perform downloading, and then the client downloads the main package or a sub-package. If the client wants to download another sub-package, the client sends another download request. In other words, to download the entire application package, the client needs to send a plurality of download requests. This greatly reduces a speed at which the client downloads the application package, and severely affects user experience.

SUMMARY

To overcome the foregoing problem, embodiments of this application provide an application package splitting and reassembly method and apparatus, and an application package running method and apparatus.

To achieve the foregoing objective, the following technical solutions are used in the embodiments of this application.

According to a first aspect, this application provides an application package splitting and reassembly method. The method is implemented by a server and includes: receiving a first application package corresponding to an application; splitting the first application package into a main package and at least one sub-package, where the main package and the at least one sub-package each include at least one page of the application; storing the main package and the at least one sub-package in a first file, and determining offsets and sizes that are of the main package and the at least one sub-package in the first file; and generating a second application package corresponding to the application, where the second application package includes a header and the first file, and the header includes a mapping relationship between the main package and at least one page of the application in the main package, a mapping relationship between the at least one sub-package and at least one page of the application in the at least one sub-package, and the offsets and the sizes that are of the main package and the at least one sub-package in the first file. After receiving the original application package, the server automatically performs splitting and reassembly on the original application package, to generate a complete new application package. In this way, a developer does not need to perform splitting or maintain a sub-package obtained through splitting, thereby reducing development costs of the developer. In addition, in a reassembly process, the main package and the plurality of sub-packages that are obtained through splitting are combined into one file. When performing downloading, a client only needs to send one download request to download the complete application package.

In another possible implementation, the method includes: generating an abstract list of the main package for the main package and an abstract list of the at least one sub-package for the at least one sub-package, where the abstract list of the main package is used for verifying the corresponding main package, and the abstract list of the at least one sub-package is used for verifying the corresponding sub-package; and the generating a second application package corresponding to the application includes: writing the abstract list of the main package and the abstract list of the at least one sub-package into the header, so that after downloading the main package or the sub-package, the client verifies the downloaded main package or the downloaded sub-package based on these abstract lists, to determine whether the downloaded main package or the downloaded sub-package is tampered with by a third party.

In another possible implementation, the generating an abstract list of the main package for the main package and an abstract list of the at least one sub-package for the at least one sub-package includes: generating the abstract list of the main package for the main package and the abstract list of the at least one sub-package for the at least one sub-package by using a hash algorithm.

In another possible implementation, the method includes: signing the header to obtain signature information, where the signature information is used for verifying the header; and writing the signature information into the second application package, so that the client verifies the header after downloading the header, to determine whether the header is tampered with by a third party.

In another possible implementation, the main package includes a meta-information file, used for running the main package and the at least one sub-package.

In another possible implementation, a first sub-package in the at least one sub-package includes a configuration attribute, used to declare whether the first sub-package depends on the main package for running.

In another possible implementation, the main package includes a capability open-up set, used for obtaining a meta-information file by the sub-package that depends on the main package.

In another possible implementation, the method includes: synchronizing, to a send port, a download address of the second application package and package information that includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file, for the client to query and download the second application package, thereby facilitating the client's query and downloading of the new application package.

According to a second aspect, this application provides an application package splitting and reassembly apparatus, including a transceiver, a processor, and a memory. The memory stores one or more programs. The one or more programs include an instruction. When the instruction is executed by the apparatus, the apparatus is enabled to perform the method in the first aspect.

According to a third aspect, this application provides an application package running method. The method is implemented by a client and includes: sending a download request to a server, where the download request is used for requesting to download a second application package corresponding to an application, the second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file; downloading the header; downloading the main package in the first file; and after determining, based on the offset and the size that are of the main package in the first file in the header, that the main package is downloaded, running the main package, and loading the at least one page of the application in the main package based on the mapping relationship between the main package and the at least one page of the application in the main package in the header. In a process of downloading the new application package, network connecting is performed once. After downloading the header and the main package, the client runs the main package. The server combines, into one file, the main package and the plurality of sub-packages that are obtained through splitting. Therefore, after the main package is downloaded, a subsequent sub-package can be downloaded without requiring network connecting to the server to be performed again. In this way, it is implemented that the client only needs to perform network connecting once to download the entire new application package, thereby effectively reducing a download time.

In another possible implementation, the method further includes: downloading the first sub-package in the first file, where the first sub-package includes a configuration attribute, declaring that the first sub-package depends on the main package for running; after determining, based on the offset and the size that are of the at least one sub-package in the first file in the header, that the first sub-package is downloaded, obtaining a meta-information file based on the configuration attribute and by using a capability open-up set in the main package; and running the first sub-package based on the meta-information file, and loading at least one page of the application in the first sub-package based on the mapping relationship between the first sub-package and the at least one page of the application in the first sub-package.

In another possible implementation, the method further includes: downloading the second sub-package in the first file, where the second sub-package includes a configuration attribute, declaring that the second sub-package does not depend on the main package for running; and after determining, based on the offset and the size that are of the at least one sub-package in the first file in the header, that the second sub-package is downloaded, running the second sub-package, and loading at least one page of the application in the second sub-package based on the mapping relationship between the second sub-package and the at least one page of the application in the second sub-package.

In another possible implementation, the method includes: determining, based on the mapping relationship between the at least one sub-package and the at least one page of the application in the at least one sub-package, a third sub-package corresponding to a currently visited page; and when the third sub-package is not in a local file, starting another thread to download the third sub-package. The thread is added to preferentially download the third sub-package, and after the downloading is completed, loading and running are started, thereby reducing a user's waiting time and improving user experience.

In another possible implementation, the header further includes an abstract list of the main package and an abstract list of the at least one sub-package; and the method includes: obtaining the abstract list of the main package and the abstract list of the at least one sub-package; and verifying the main package or the at least one sub-package by using the abstract list of the main package and the abstract list of the at least one sub-package. The client needs to verify the main package and the sub-package, to verify whether the main package and the sub-package are tampered with, and to ensure that the main package and the sub-package that are downloaded by the client are valid.

In another possible implementation, the method includes: downloading signature information, where the signature information is obtained by signing the header; and the method includes: verifying the header by using the signature information. The client needs to perform signature verification on the header to ensure validity of the header.

According to a fourth aspect, this application provides an application package running apparatus, including a transceiver, a processor, and a memory. The memory stores one or more programs. The one or more programs include an instruction. When the instruction is executed by the apparatus, the apparatus is enabled to perform the method in the third aspect.

According to a fifth aspect, this application provides an application package running method. The method is implemented by a client and includes: in response to a request to load a target page of an application, obtaining a name of the application; sending a query request to a server based on the name of the application, where the query request is used for requesting to download, from the server, a download address and package information that are of a second application package corresponding to the application, the second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file; receiving the download address and the package information; after determining, based on the package information, a target sub-package corresponding to the target page, downloading the target sub-package from the server based on the download address, and downloading the header and the main package in the first file while downloading the target sub-package; and running the target sub-package based on the main package, and loading the target page based on the mapping relationship between the at least one sub-package and the at least one page of the application in the at least one sub-package in the header. When a target page visited by the client is in a sub-package, the client needs to obtain a mapping relationship between a page and a sub-package, and an offset and a size that are of the sub-package in a file, where the mapping relationship, the offset, and the size are obtained through a send port of the server, and then the client can find, by query, the target sub-package corresponding to the target page. After downloading the target sub-package, a header, and a main package, the client may run the target sub-package and load the target page. In this way, a download and running time of the target page can be minimized, thereby ensuring user experience.

In another possible implementation, the package information includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file; and the determining, based on the package information, a target sub-package corresponding to the target page includes: determining, based on the mapping relationship between the at least one sub-package and the at least one page of the application in the at least one sub-package, the target sub-package corresponding to the target page; and determining an offset and a size that are of the target sub-package.

In another possible implementation, the downloading the header and the main package in the first file while downloading the target sub-package specifically includes: starting a first thread and a second thread, where the first thread is used to download the target sub-package at the download address based on the offset and the size that are of the target sub-package, and the second thread is used to download the header and the main package in the first file. Downloading is performed by using two threads, thereby effectively reducing a download time of the application package and improving user experience.

In another possible implementation, the target sub-package includes a configuration attribute, declaring that the target sub-package depends on the main package for running; and the method includes: before the running the target sub-package, and loading the target page based on the mapping relationship between the at least one sub-package and the at least one page of the application in the at least one sub-package in the header, after determining, based on the offset and the size that are of the main package in the first file, that the main package in the first file is downloaded, obtaining, by the target sub-package, a meta-information file by using a public open capability set in the main package, and running the target sub-package.

In another possible implementation, the header further includes an abstract list of the main package and an abstract list of the at least one sub-package; and the method includes: obtaining the abstract list of the main package and the abstract list of the at least one sub-package; and verifying the main package or the at least one sub-package by using the abstract list of the main package and the abstract list of the at least one sub-package. The client needs to verify the target sub-package, to verify whether the target sub-package is tampered with, and to ensure that the target sub-package downloaded by the client is valid.

In another possible implementation, the method includes: downloading signature information, where the signature information is obtained by signing the header; and the method includes: verifying the header by using the signature information. The client needs to perform signature verification on the header to ensure validity of the header.

According to a sixth aspect, this application provides an application package running apparatus, including a transceiver, a processor, and a memory. The memory stores one or more programs. The one or more programs include an instruction. When the instruction is executed by the apparatus, the apparatus is enabled to perform the method in the fifth aspect.

BRIEF DESCRIPTION OF DRAWINGS

The following briefly describes the accompanying drawings used in describing embodiments or a current technology.

DESCRIPTION OF EMBODIMENTS

Figure 1:
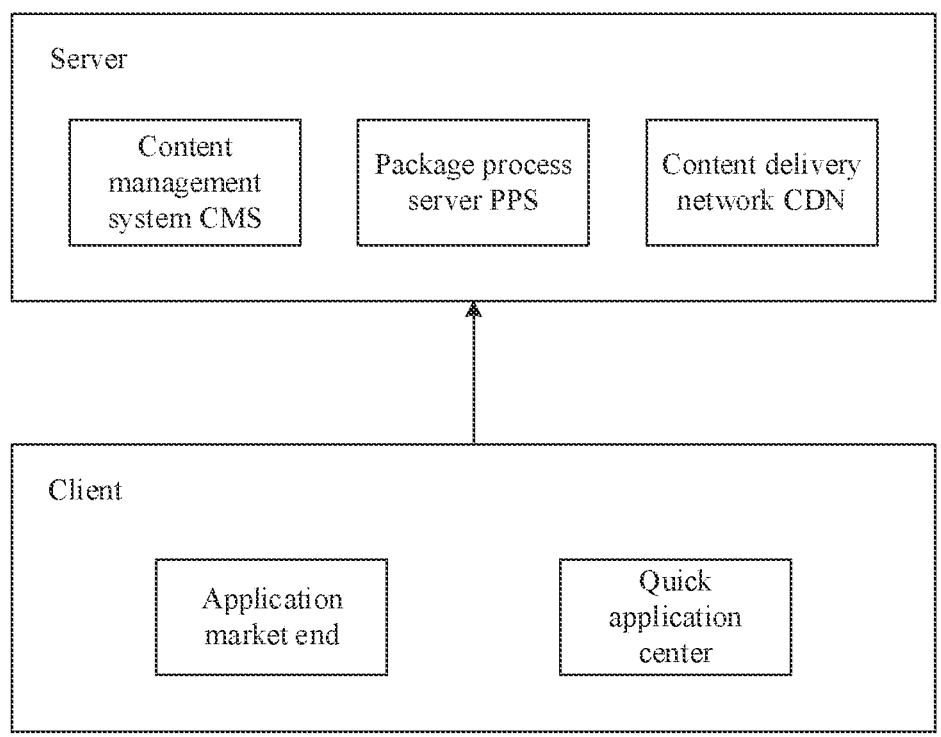
FIG. 1 is a schematic structural diagram of an application package splitting, reassembly, and download system according to an embodiment of this application.

The following describes the embodiments of this application in detail. Examples of the embodiments are shown in the accompanying drawings, where identical or similar reference numerals indicate identical or similar units or units with identical or similar functions throughout. The embodiments described below with reference to the accompanying drawings are merely examples, and are merely used to explain this application, but cannot be construed as a limitation on this application.

FIG. 1 is a schematic structural diagram of an application package splitting, reassembly, and download system according to an embodiment of this application. As shown in FIG. 1, the system includes a server. The system may allow the server to automatically perform package splitting and reassembly.

The server may include a content management system (Content Management System, CMS), a package process server (Package Process Server, PPS), and a content delivery network (Content Delivery Network, CDN).

The content management system CMS is configured to receive an original application package uploaded by a terminal, process the original application package, and then place the original application package in a content library of the content management system CMS. In an embodiment, the content management system CMS needs to verify validity of the original application package. If the original application package is valid, the content management system CMS stores the original application package to the content library of the content management system CMS. If the original application package is invalid, the content management system CMS does not store the application package.

The package process server PPS is configured to perform splitting and reassembly on the original application package, to generate a new application package.

Figure 2:
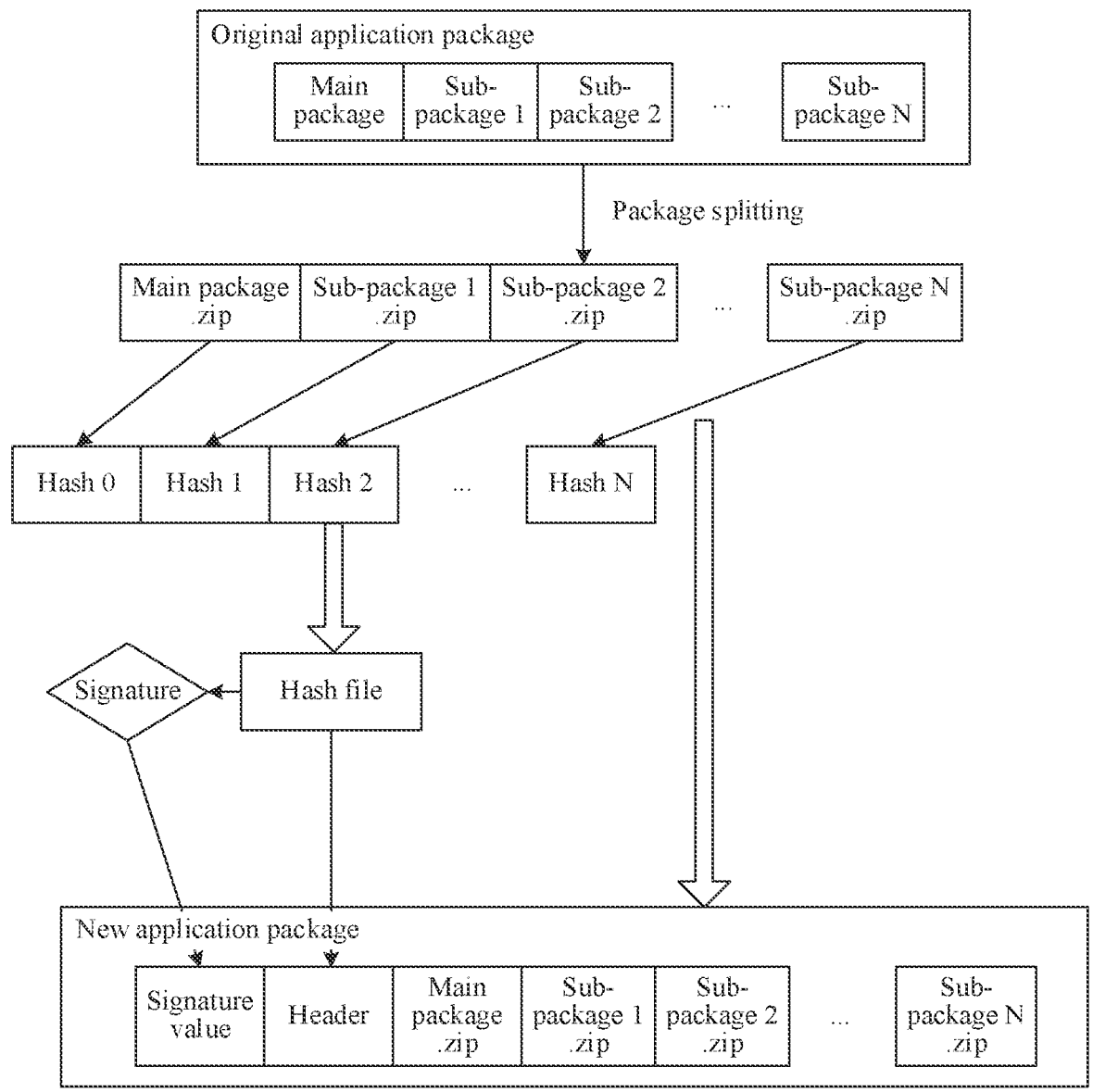
FIG. 2 is a schematic diagram of a process in which a package process server PPS performs splitting and reassembly on an original application package according to an embodiment of this application.

In an embodiment, the package process server PPS performs splitting and reassembly on an original application package, to generate a new application package. FIG. 2 is a schematic diagram of a process in which a package process server PPS performs splitting and reassembly on an original application package according to an embodiment of this application. As shown in FIG. 2, the package process server PPS first decompresses the original application package; automatically splits the original application package into one main package and a plurality of sub-packages according to a decompressed application list; then, generates one file by using the main package and the sub-packages, and certainly may compress the main package and the sub-packages in advance; then, forms a header by using a mapping relationship between a page and the main package, a mapping relationship between pages and the sub-packages, and offsets and sizes that are of the main package and the sub-packages in the file, and may perform server platform signing on the header; and finally combines a signature value generated after the server platform signing, the header, and the file into a new application package.

In a reassembly process, an advantage of combining the main package and the plurality of sub-packages that are obtained through splitting into one file is: When performing downloading, a client only needs to send one download request to download the complete application package.

In addition, the package process server PPS synchronizes, to the content delivery network CDN, package information including a mapping relationship between a page and a main package (a sub-package), and an offset and a size that are of the main package (the sub-package) in a file.

The content delivery network CDN stores a download address and package information that are of the new application package, for a client to query and download the new application package.

The system further includes the client. The client includes an application market end and a quick application center.

The application market end is configured to display a new application package to a user. When the user needs to download a new application package, the user performs an operation on the application market end, to start the quick application center to perform downloading.

The quick application center is configured to download a new application package, verify validity of the new application package, and decompress and run the new application package.

In an embodiment, the quick application center sends a download request including a link address of a new application package to the content delivery network CDN, and the content delivery network CDN sends the new application package to the quick application center according to the request. In an example, the quick application center downloads the new application package in a streaming manner. The quick application center downloads a file including a main package and a plurality of sub-packages. After downloading the main package, the quick application center runs the main package and loads a home page, and then, continues to download a sub-package in the file, runs the sub-package, and loads a page corresponding to the sub-package. In this way, it can be ensured that the client only needs to perform network connecting once to download the entire new application package, thereby effectively reducing a download time.

In another embodiment, if a page that a user wants to visit is not a home page, and the page is in a specific sub-package, the quick application center obtains, from the content delivery network CDN based on a name of a new application package, a download address and package information that are of the new application package. Then, after finding, by query based on the package information, a target sub-package corresponding to the page to be visited, the quick application center starts two download threads, one for downloading the target sub-package, and the other for directly downloading a header and a main package in a file that are in the new application package. After the two threads complete downloading, the quick application center runs the target sub-package by using the main package, and loads the target page corresponding to the target sub-package. In this way, a download and running time of the target page can be minimized, thereby ensuring user experience.

Figure 3:
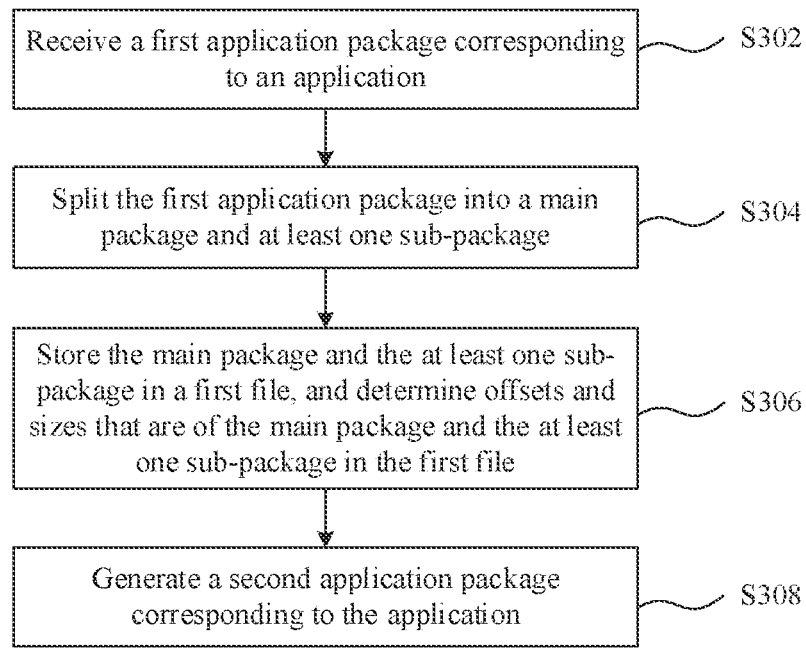
FIG. 3 is a flowchart of an application package splitting and reassembly method according to an embodiment of this application.

FIG. 3 is a flowchart of an application package splitting and reassembly method according to an embodiment of this application. The method is implemented, for example, on a server. The application package splitting and reassembly method shown in FIG. 3 includes the following specific steps.

Step S302: Receive a first application package corresponding to an application.

The first application package is an original application package developed by a developer. The original application package is an application package that is not split. The developer may directly upload the original application package to the server, and the server performs package splitting.

Alternatively, the developer splits the original application package to obtain an application package including one main package and a plurality of sub-packages. However, the application package obtained through splitting may be inappropriate. In a download process, a client needs to send a plurality of download requests to download the complete application package. Therefore, the server needs to perform package splitting and reassembly again.

In an embodiment, before the first application package is received, the developer may sign the first application package. The developer signs the first application package by using a private key of a terminal, and packs, into the first application package, a signature value generated after the signing, and then the terminal uploads the first application package to the server. The signature value includes a public key.

After receiving the first application package uploaded by the terminal, the server first needs to verify whether the first application package is valid. The server performs splitting and reassembly on the first application package only when the first application package is valid. The server signs the first application package based on the public key in the received signature value. If a generated signature value is the same as the signature value received by the server, it indicates that the first application package is valid. If a generated signature value is different from the signature value received by the server, the first application package is invalid. In this case, the server does not perform splitting or reassembly on the first application package.

Step S304: Split the first application package into a main package and at least one sub-package.

After receiving the first application package, the server decompresses the first application package, and automatically splits the first application package into the main package and the plurality of sub-packages according to a decompressed application list. The main package includes at least one page, and the at least one page includes a home page. Each of the plurality of sub-packages includes at least one page.

Preferably, the main package further includes a meta-information file. The meta-information file is a manifest file. Android is used as an example. Each Android application program needs to have a manifest file. The manifest file provides important information in an application of an Android system, and can run code of any application program. In this application, after downloading the main package, the client can run the main package based on the meta-information file; and after downloading a sub-package, the client can run the sub-package based on the meta-information file.

Preferably, the sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

Preferably, the main package further includes a capability open-up set. The capability open-up set includes some common capabilities that are used by all in the application. The sub-package depends on the capability open-up set, but the capability open-up set does not depend on the sub-package. In this application, the dependent sub-package obtains the meta-information file in the main package by using the capability open-up set.

Step S306: Store the main package and the at least one sub-package in a first file, and determine offsets and sizes that are of the main package and the at least one sub-package in the first file.

The server combines the generated main package and at least one sub-package into a file, and determines the offsets of the main package and each sub-package in the file and the size of each sub-package.

Storage positions of the main package and the sub-packages in the file may be determined based on the offsets of the main package and each sub-package in the file and the size of each sub-package, to facilitate the client's downloading. In an embodiment, when an application package is downloaded, a file is of 1500 bytes, and includes two packages: one main package and one sub-package. The main package occupies 800 bytes. In this case, an offset of the sub-package in the file is 800, and a size of the sub-package is 700 bytes.

Step S308: Generate a second application package corresponding to the application.

After generating the file, the server combines, into a header, a mapping relationship between the main package and at least one page of the application in the main package, a mapping relationship between the at least one sub-package and at least one page of the application in the at least one sub-package, and the offsets and the sizes that are of the main package and the at least one sub-package in the first file, and finally, combines the header and the file into the second application package.

Preferably, the server separately performs a hash operation on the main package and each sub-package, to generate an abstract list of the main package and an abstract list of each sub-package, and then writes these abstract lists into the header, so that after downloading the main package or the sub-package, the client verifies the downloaded main package or the downloaded sub-package based on these abstract lists, to determine whether the downloaded main package or the downloaded sub-package is tampered with by a third party.

Preferably, the server further needs to sign the header, and pack a generated signature value into the second application package, so that the client verifies the header after downloading the header, to determine whether the header is tampered with by a third party.

After step S308, the server further synchronizes, to a send port, a download address of the second application package and package information that includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file, for the client to query and download the second application package.

This embodiment of this application provides a package splitting and reassembly method performed on the server. After receiving the original application package, the server automatically performs splitting and reassembly on the original application package, to generate a complete new application package. In this way, the developer does not need to perform splitting or maintain a sub-package obtained through splitting, thereby reducing development costs of the developer. In a reassembly process, the main package and the plurality of sub-packages that are obtained through splitting are combined into one file. In this case, when performing downloading, the client only needs to send one download request to download the complete application package. In addition, the server synchronizes, to the send port, the mapping relationship between the page and the main package (the sub-package), and the offset and the size that are of the main package (the sub-package) in the file, thereby facilitating the client's query and downloading of the new application package.

Figure 4:
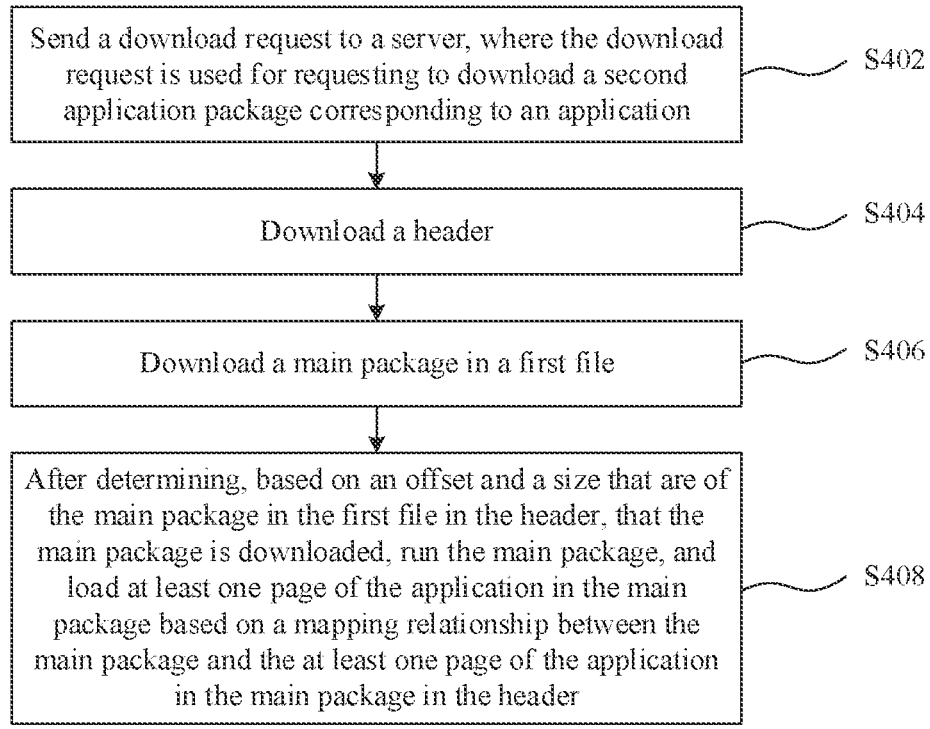
FIG. 4 is a flowchart of an application package running method according to an embodiment of this application.

FIG. 4 is a flowchart of an application package running method according to an embodiment of this application. The method is implemented, for example, on a client. The application package downloading and running method shown in FIG. 4 includes the following specific steps.

Step S402: Send a download request to a server, where the download request is used for requesting to download a second application package corresponding to an application.

Specifically, the client sends, to the server, the request for downloading the second application package. The server receives the download request at a send port, and downloads the second application package based on a download address of the second application package.

The second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file.

Step S404: Download the header.

Step S406: Download the main package in the first file.

Preferably, in this application, a download manner of streaming downloading is used, that is, a download manner of running while downloading. In this application, after downloading the main package, the client downloads a sub-package while running the main package. The client downloads components of the second application package in the following sequence: a signature value, the header, and the file. The client sends, to the server, the request for downloading the second application package. The server gradually sends the components of the second application package to the client.

The main package includes a meta-information file and a home page. The meta-information file is used to help the client run the main package after the client downloads the main package, or help the client run a sub-package after the client downloads the sub-package. Both the main package and each sub-package include at least one page.

Preferably, if the client receives the signature value sent by the server, the client needs to perform signature verification on the header, to ensure validity of the header. In an embodiment, the client signs the header based on a public key in the signature value. If a generated signature value is the same as the signature value received by the client, it indicates that the header is valid and is not tampered with. If a generated signature value is different from the signature value received by the client, it indicates that an exception occurs in the header. In this case, the client terminates downloading of the second application package.

Step S408: After determining, based on the offset and the size that are of the main package in the first file in the header, that the main package is downloaded, run the main package, and load the at least one page of the application in the main package based on the mapping relationship between the main package and the at least one page of the application in the main package in the header.

Preferably, if the header includes an abstract list of the main package, the client needs to verify the main package, to verify whether the main package is tampered with. In an embodiment, the client performs a hash operation on the downloaded main package. If a generated abstract list of the main package is the same as the abstract list of the main package in the header, it indicates that the main package is not tampered with. In this case, the client decompresses the main package, runs the main package based on the meta-information file in the main package, and loads the home page. If a generated abstract list of the main package is different from the abstract list of the main package in the header, it indicates that an exception occurs in the main package. In this case, the client stops processing the main package, and terminates downloading of the second application package.

Preferably, the sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

In an embodiment, the client determines, based on the offset and the size that are of the at least one sub-package in the file, a sub-package to be downloaded. If the sub-package to be downloaded is a dependent sub-package, the client obtains the meta-information file from the main package based on the configuration attribute and by using a capability open-up set, runs the dependent sub-package, and loads at least one page in the dependent sub-package based on the mapping relationship between the dependent sub-package and the at least one page in the dependent sub-package.

In an embodiment, the client determines, based on the offset and the size that are of the at least one sub-package in the file, a sub-package to be downloaded. If the sub-package to be downloaded is an independent sub-package, the client runs the independent sub-package, and loads at least one page in the independent sub-package based on the mapping relationship between the independent sub-package and the at least one page in the independent sub-package.

In addition, if a user taps a specific jump link during use, and a target page is not in a local file, the client starts a thread again, to preferentially download, based on the mapping relationship between the sub-package and the page in the sub-package, a sub-package to which the target page belongs, and starts loading and running.

It should be noted that validity verification is performed once every time one sub-package is downloaded, and the sub-package is installed locally as a part of the entire application program only after the verification succeeds.

According to the present invention, in a process of downloading the second application package, the client performs network connecting once. After downloading the header and the main package, the client runs the main package. The server combines, into one file, the main package and the plurality of sub-packages that are obtained through splitting. Therefore, after the main package is downloaded, a subsequent sub-package can be downloaded without requiring network connecting to the server to be performed again. In this way, it is implemented that the client only needs to perform network connecting once to download the entire new application package, thereby effectively reducing a download time.

Figure 5:
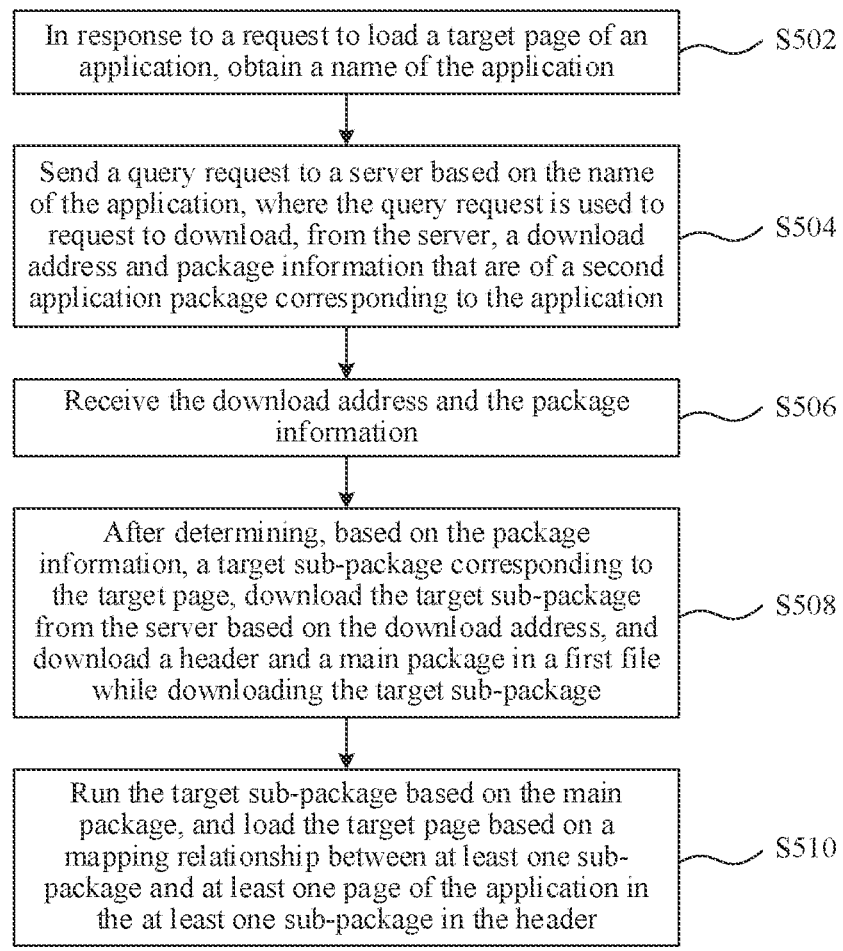
FIG. 5 is a flowchart of another application package running method according to an embodiment of this application.

FIG. 5 is a flowchart of another application package running method according to an embodiment of this application. The method is implemented, for example, on a client.

The application package downloading and running method shown in FIG. 5 includes the following specific steps.

Step S502: In response to a request to load a target page of an application, obtain a name of the application.

In an embodiment, in response to a request, sent by a user, to visit a Taobao page to purchase a specific product, the client obtains a name Taobao of an application package based on the request. The target page is in a sub-package of a second application package corresponding to the application.

Step S504: Send a query request to a server based on the name of the application, where the query request is used for requesting to download, from the server, a download address and package information that are of the second application package corresponding to the application.

Specifically, the download address and the package information that are of the second application package are obtained from a send port of the server.

The second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file.

The package information includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file.

Step S506: Receive the download address and the package information.

Step S508: After determining, based on the package information, a target sub-package corresponding to the target page, download the target sub-package from the server based on the download address, and download the header and the main package in the first file while downloading the target sub-package.

Specifically, after receiving the download address and the package information, the client determines, based on the mapping relationship between the sub-package and the page in the package information, the target sub-package corresponding to the page to be visited, and then determines an offset of the target sub-package and a size of the target sub-package based on the offset and the size that are of the sub-package in the file.

Preferably, a process in which the client downloads the target sub-package, the header, and the header in the first file is as follows: starting two threads, where a first thread is used to download the target sub-package at the download address based on the offset and the size that are of the target sub-package, and a second thread is used to download the header and the main package in the first file.

Step S510: Run the target sub-package based on the main package, and load the target page based on the mapping relationship between the at least one sub-package and the at least one page of the application in the at least one sub-package in the header.

Preferably, if the client receives a signature value sent by the server, the client may perform signature verification on the header by using the signature value, to ensure validity of the header. In an embodiment, the client signs the header based on a public key in the signature value. If a generated signature value is the same as the signature value received by the client, it indicates that the header is valid and is not tampered with. If a generated signature value is different from the signature value received by the client, it indicates that an exception occurs in the header. In this case, the client terminates downloading of the second application package.

Preferably, if the header includes an abstract list of the main package and an abstract list of a sub-package, the client may verify the main package and the target sub-package by using the abstract list of the main package and the abstract list of the sub-package, to verify whether the main package and the target sub-package are tampered with. In an embodiment, the client performs a hash operation on the downloaded main package. If a generated abstract list of the main package is the same as the abstract list of the main package in the header, it indicates that the main package is not tampered with. In this case, the client decompresses the main package, runs the main package based on a meta-information file in the main package, and loads a home page. If a generated abstract list of the main package is different from the abstract list of the main package in the header, it indicates that an exception occurs in the main package. In this case, the client stops processing the main package, and terminates downloading of the second application package.

Preferably, the sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

If the sub-package to be downloaded is a dependent sub-package, before running the target sub-package, and loading at least one page in the target sub-package based on the mapping relationship between the target sub-package and the at least one page in the target sub-package, the client determines the main package based on the offset and the size that are of the sub-package in the file, and loads the target sub-package based on the meta-information file in the main package.

If the sub-package to be downloaded is an independent sub-package, the client may directly run the sub-package with no need to wait for completion of loading of the main package.

In the present invention, when a target page visited by the client is in a sub-package, the client needs to obtain a mapping relationship between a page and a sub-package, and an offset and a size that are of the sub-package in a file, where the mapping relationship, the offset, and the size are obtained through a send port of the server, and then the client can find, by query, the target sub-package corresponding to the target page. After downloading the target sub-package, a header, and a main package, the client may run the target sub-package and load the target page. In this way, a download and running time of the target page can be minimized, thereby ensuring user experience.

Figure 6:
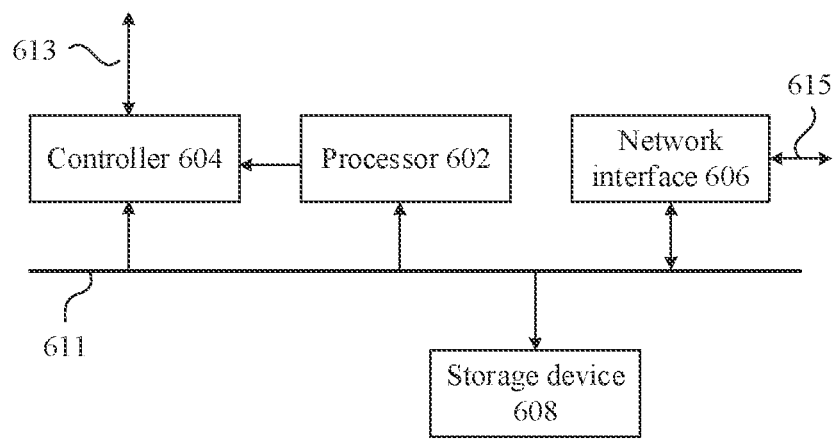
FIG. 6 is a detailed structural diagram of devices that may be used on a server to implement the foregoing various technologies according to an embodiment of this specification.

FIG. 6 is a detailed structural diagram of devices that may be used on a server to implement the foregoing various technologies according to an embodiment of this specification. The structural diagram illustrates a hardware basis that can implement the method procedure shown in FIG. 3. As shown in FIG. 6, the devices may include a processor 602. The processor represents a microprocessor or controller 604 that is configured to control overall operations of a server. A data bus 611 may help perform data transmission between a storage device 608, the processor 602, and the controller 604. The controller 604 may be configured to interact with and control different devices by using a device control bus 613. The devices may further include a network/bus interface 606 coupled to a data link 615. In a case of a wireless connection, the network/bus interface 606 may include a wireless transceiver.

The devices further include the storage device 608. In an embodiment, the storage device 608 is configured to store an application package or a file received by the network/bus interface 606, so that during running, the processor 602 obtains the application package or file in the storage device 608, and processes the application package or file, including performing verification on the application package, and performing splitting and reassembly on the application package to generate a new application package. Alternatively, the storage device 608 may store an application package or a file processed by the processor 602, so that the application package or file in the storage device 608 is sent to another client or a running program according to an instruction received by the network/bus interface 606.

It should be understood that in many aspects, the devices described herein may use or be combined with the method embodiments described above.

Persons skilled in the art should be aware that in the foregoing one or more examples, functions described in the embodiments of this specification may be implemented by hardware, software, firmware, or any combination thereof. When software is used to implement the embodiments, the foregoing functions may be stored in a computer-readable medium or transmitted as one or more instructions or code in the computer-readable medium. According to an embodiment in another aspect, a computer readable storage medium is further provided, and stores a computer program. When the computer program is executed in a computer, the computer is enabled to perform the method described with reference to FIG. 3.

Figure 7:
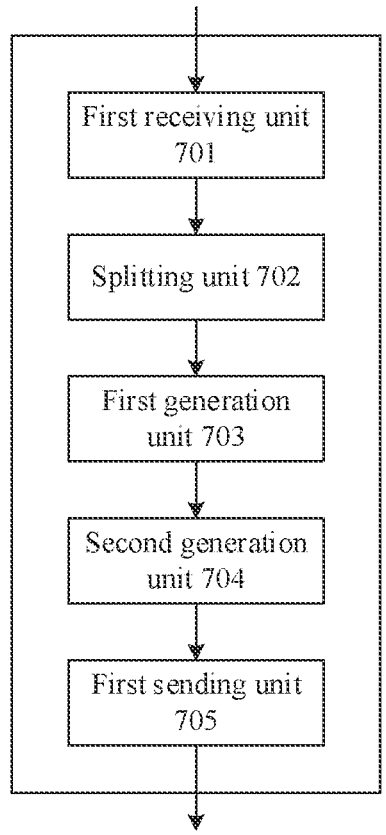
FIG. 7 is a structural block diagram of an application package splitting and reassembly apparatus according to an embodiment of this application.

FIG. 7 is a structural block diagram of an application package splitting and reassembly apparatus according to an embodiment of this application. As shown in FIG. 7, the apparatus includes a first receiving unit 701, a splitting unit 702, a first generation unit 703, a second generation unit 704, and a first sending unit 705.

The first receiving unit 701 is configured to receive a first application package corresponding to an application.

The first application package is an original application package developed by a developer. The original application package is an application package that is not split. The developer may directly upload the original application package to a server, and the server performs package splitting. Alternatively, the developer splits the original application package to obtain an application package including one main package and a plurality of sub-packages. However, the splitting may be inappropriate. Therefore, the server needs to perform package splitting and reassembly again.

In an embodiment, before the first receiving unit 701 receives the first application package, the developer may sign the first application package. The developer signs the first application package by using a private key of a terminal, and packs, into the first application package, a signature value generated after the signing. Then, the terminal uploads the first application package to the server. The signature value includes a public key.

The splitting unit 702 is configured to split the first application package into a main package and at least one sub-package.

The splitting unit 702 decompresses the first application package, and automatically splits the first application package into the main package and the plurality of sub-packages according to the decompressed application list. The main package includes at least one page, and the at least one page includes a home page. Each of the plurality of sub-packages includes at least one page.

In an embodiment, the main package further includes a meta-information file. The meta-information file is a manifest file. Each Android application program needs to have a manifest file. The manifest file provides important information for application of each Android application program in an Android system, and can run code of any application program. In this application, after downloading the main package, a client can run the main package based on the meta-information file; and after downloading a sub-package, the client can run the sub-package based on the meta-information file.

In an embodiment, the sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

In an embodiment, the main package further includes a capability open-up set. The capability open-up set includes some common capabilities that are used by all in the application. The sub-package depends on the capability open-up set, but the capability open-up set does not depend on the sub-package. In this application, the dependent sub-package obtains the meta-information file in the main package by using the capability open-up set.

After receiving the first application package uploaded by the terminal, the first receiving unit 701 first needs to verify whether the first application package is valid. The splitting unit 702 performs splitting and reassembly on the first application package only when the first application package is valid. The first receiving unit 701 signs the first application package based on the public key in the received signature value. If a generated signature value is the same as the signature value received by the first receiving unit 701, it indicates that the first application package is valid. If a generated signature value is different from the signature value received by the first receiving unit 701, the first application package is invalid. In this case, the splitting unit 702 does not perform splitting or reassembly on the first application package.

The first generation unit 703 is configured to: store the main package and the at least one sub-package in a first file, and determine offsets and sizes that are of the main package and the at least one sub-package in the first file.

The first generation unit 703 combines, into a file, the main package and the at least one sub-package that are obtained through splitting performed by the splitting unit 702, and determines the offset of each sub-package in the file and the size of each sub-package.

Storage positions of the sub-packages in the file may be determined based on the offset of each sub-package in the file and the size of each sub-package, to facilitate the client's downloading. In an embodiment, when an application package is downloaded, a file is of 1500 bytes, and includes two packages: one main package and one sub-package. The main package occupies 800 bytes. In this case, an offset of the sub-package in the file is 800, and a size of the sub-package is 700 bytes.

The second generation unit 704 is configured to generate a second application package corresponding to the application.

After the file is generated, the first generation unit 703 combines, into a header, a mapping relationship between the main package and at least one page of the application in the main package, a mapping relationship between the at least one sub-package and at least one page of the application in the at least one sub-package, and the offsets and the sizes that are of the main package and the at least one sub-package in the first file, and finally, combines the header and the file into the second application package.

In an embodiment, the second generation unit 704 is further configured to separately perform a hash operation on the main package and each sub-package, to generate an abstract list of the main package and an abstract list of each sub-package, and then writes these abstract lists into the header, so that after downloading the main package or the sub-package, the client verifies the downloaded main package or the downloaded sub-package based on these abstract lists, to determine whether the downloaded main package or the downloaded sub-package is tampered with by a third party.

In an embodiment, the second generation unit 704 is further configured to sign the header, and pack a generated signature value into the second application package, so that the client verifies the header after downloading the header, to determine whether the header is tampered with by a third party.

The first sending unit 705 is configured to send a download address of the second application package, and package information, generated by the second generation unit 704, that includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file, for the client to query and download the second application package.

Figure 8:
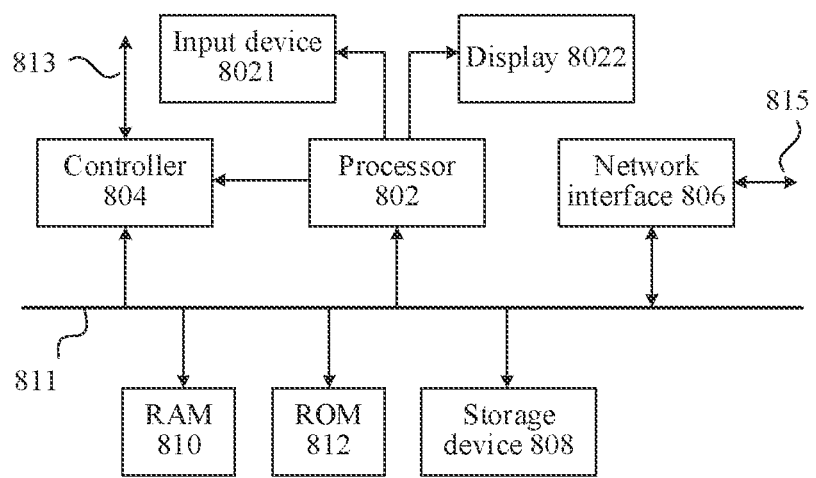
FIG. 8 is a detailed structural diagram of devices that may be used on a client to implement the foregoing various technologies according to an embodiment of this specification.

FIG. 8 is a detailed structural diagram of devices that may be used on a client to implement the foregoing various technologies according to an embodiment of this specification. The structural diagram illustrates a hardware basis that can implement the method procedures shown in FIG. 4 and FIG. 5. As shown in FIG. 8, the devices may include a processor 802. The processor represents a microprocessor or controller 804 that is configured to control overall operations of a client. A data bus 811 may help perform data transmission between a storage device 808, the processor 802, and the controller 804. The controller 804 may be configured to interact with and control different devices by using a device control bus 8013. The devices may further include a network/bus interface 806 coupled to a data link 815. In a case of a wireless connection, the network/bus interface 806 may include a wireless transceiver.

The devices further include the storage device 808. In an example, the storage device 808 is configured to store an application package and file received by the network/bus interface 806, so that during running, the processor 802 obtains the application package or file in the storage device 808, and processes the application package or file, including verifying, running, and loading the application package.

In another example, the storage device further stores a client program or another application program. During operation, the client or the another application program is loaded into a RAM 812 from a RAM 810, to control the processor 802 to perform a corresponding operation, so that an application package and file from a server can be run, and a page can be loaded. In an example, the client program and the another application program can perform an encryption operation on the application package and the file.

In yet another example, the storage device further stores an application program. During operation, the application program is loaded into a RAM 812 from a RAM 810, to control the processor 802 to perform a corresponding operation, so that an application package and file from a server can be run, and a page can be loaded. In an example, the application program can perform decryption and hash signature operations on the file or data.

It should be understood that in many aspects, the devices described herein may use or be combined with the method embodiments described above.

Persons skilled in the art should be aware that in the foregoing one or more examples, functions described in the embodiments of this specification may be implemented by hardware, software, firmware, or any combination thereof. When software is used to implement the embodiments, the foregoing functions may be stored in a computer-readable medium or transmitted as one or more instructions or code in the computer-readable medium. According to an embodiment in another aspect, a computer readable storage medium is further provided, and stores a computer program. When the computer program is executed in a computer, the computer is enabled to perform the methods described with reference to FIG. 4 and FIG. 5.

Figure 9:
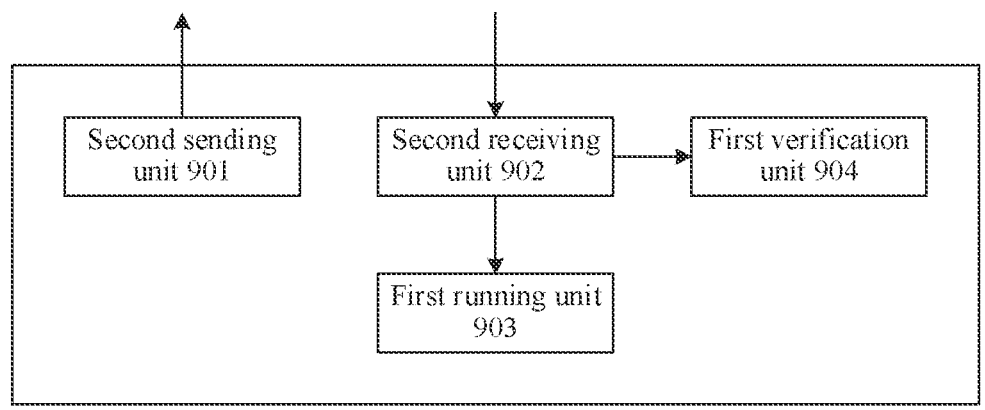
FIG. 9 is a structural block diagram of an application package running apparatus according to an embodiment of this application.

FIG. 9 is a structural block diagram of an application package running apparatus according to an embodiment of this application. As shown in FIG. 9, the apparatus includes a second sending unit 901, a second receiving unit 902, a first running unit 903, and a first verification unit 904.

The second sending unit 901 is configured to send a download request to a server, where the download request is used for requesting to download a second application package corresponding to an application.

Specifically, the second sending unit 901 sends, to the server, the request for downloading the second application package. The first sending unit 705 receives the download request, and downloads the second application package based on a download address of the second application package.

The second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file.

The second receiving unit 902 is configured to download the header and download the main package in the first file.

In this application, a download manner of streaming downloading is used, that is, a download manner of running while downloading. In the streaming download manner, a client downloads components of the second application package in the following sequence: a signature value, the header, and the file. The client sends, to the server, the request for downloading the second application package.

The server gradually sends the components of the second application package to the client.

The main package includes a meta-information file and a home page. The meta-information file is used to help the client run the main package after the client downloads the main package, or help the client run a sub-package after the client downloads the sub-package. Both the main package and each sub-package include at least one page.

In an embodiment, the second receiving unit 902 is further configured to receive the signature value sent by the server. The client needs to perform signature verification on the header, to ensure validity of the header. The first verification unit 904 is configured to sign the header based on a public key in the signature value. If a generated signature value is the same as the signature value received by the second receiving unit 902, it indicates that the header is valid and is not tampered with. If a generated signature value is different from the signature value received by the second receiving unit 902, it indicates that an exception occurs in the header. In this case, the second receiving unit 902 terminates downloading of the second application package.

In an embodiment, the second receiving unit 902 is further configured to receive an abstract list of the main package in the header. The client needs to verify the main package, to verify whether the main package is tampered with. The first verification unit 904 is configured to perform a hash operation on the downloaded main package. If a generated abstract list of the main package is the same as the abstract list of the main package in the header, it indicates that the main package is not tampered with. If a generated abstract list of the main package is different from the abstract list of the main package in the header, it indicates that an exception occurs in the main package. In this case, the second receiving unit 902 stops processing the main package, and terminates downloading of the second application package.

The first running unit 903 is configured to: after determining, based on the offset and the size that are of the main package in the first file in the header, that the main package is downloaded, run the main package, and load the at least one page of the application in the main package based on the mapping relationship between the main package and the at least one page of the application in the main package in the header.

After the first running unit 903 runs the main package, the second receiving unit 902 further needs to continue to download the sub-package.

The sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

In an embodiment, the second receiving unit 902 is further configured to determine, based on the offset and the size that are of the at least one sub-package in the file, a sub-package to be downloaded. If the sub-package to be downloaded is a dependent sub-package, the first running unit 903 obtains the meta-information file from the main package based on the configuration attribute and by using a capability open-up set, runs the dependent sub-package, and loads at least one page in the dependent sub-package based on the mapping relationship between the dependent sub-package and the at least one page in the dependent sub-package.

In an embodiment, the second receiving unit 902 is further configured to determine, based on the offset and the size that are of the at least one sub-package in the file, a sub-package to be downloaded. If the sub-package to be downloaded is an independent sub-package, the first running unit 903 runs the independent sub-package, and loads at least one page in the independent sub-package based on the mapping relationship between the independent sub-package and the at least one page in the independent sub-package.

In an embodiment, the second receiving unit 902 is further configured to: if a user taps a specific jump link during use, and a target page is not in a local file, start a thread again, to preferentially download, based on the mapping relationship between the sub-package and the page in the sub-package, a sub-package to which the target page belongs. The first running unit 903 is further configured to start loading and run the sub-package.

It should be noted that validity verification is performed once every time one sub-package is downloaded, and the sub-package is installed locally as a part of the entire application program only after the verification succeeds.

Figure 10:
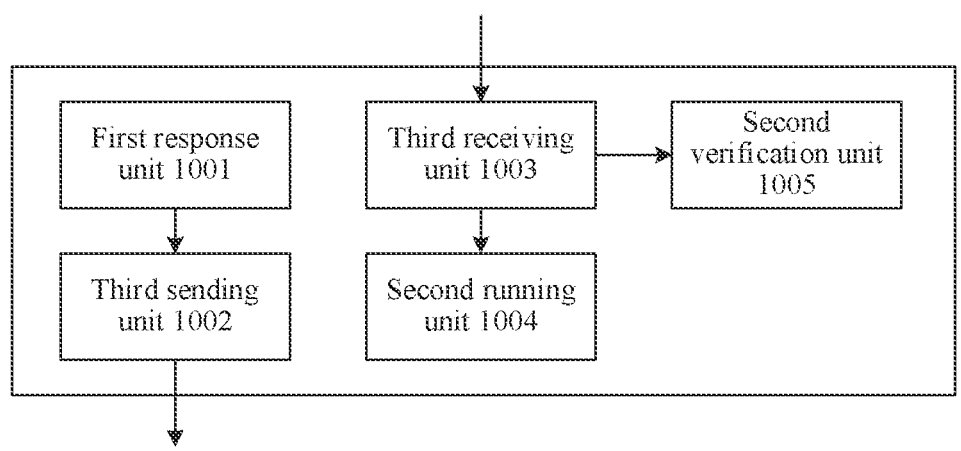
FIG. 10 is a structural block diagram of another application package running apparatus according to an embodiment of this application.

FIG. 10 is a structural block diagram of another application package running apparatus according to an embodiment of this application. As shown in FIG. 10, the apparatus includes a first response unit 1001, a third sending unit 1002, a third receiving unit 1003, a second running unit 1004, and a second verification unit 1005.

The first response unit 1001 is configured to: in response to a request to load a target page of an application, obtain a name of the application.

The third sending unit 1001 is configured to send a query request to a server based on the name of the application, where the query request is used for requesting to download, from the server, a download address and package information that are of a second application package corresponding to the application.

Specifically, the download address and the package information that are of the second application package are obtained from the first sending unit 705.

The second application package includes a header and a first file, the first file stores a main package and at least one sub-package, and the header includes a mapping relationship between the main package and at least one page of the application in the main package, a mapping relationship between the at least one sub-package and at least one page of the application in the at least one sub-package, and offsets and sizes that are of the main package and the at least one sub-package in the first file.

The package information includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file.

The third receiving unit 1002 is configured to: receive the download address and the package information, and after determining, based on the package information, a target sub-package corresponding to the target page, download the target sub-package from the server based on the download address, and download the header and the main package in the first file while downloading the target sub-package.

After receiving the download address and the package information, the third receiving unit 1002 determines, based on the mapping relationship between the sub-package and the page in the package information, the target sub-package corresponding to the page to be visited, and then determines an offset of the target sub-package and a size of the target sub-package based on the offset and the size that are of the sub-package in the file.

The second running unit 1004 is configured to: run the target sub-package based on the main package, and load the target page based on the mapping relationship between the at least one sub-package and the at least one page of the application in the at least one sub-package in the header.

In an embodiment, the third receiving unit 1002 is further configured to receive a signature value. The signature value may be used for performing signature verification on the header, to ensure validity of the header. The second verification unit 1005 is configured to sign the header based on a public key in the signature value. If a generated signature value is the same as the signature value received by the third receiving unit 1002, it indicates that the header is valid and is not tampered with. If a generated signature value is different from the signature value received by the third receiving unit 1002, it indicates that an exception occurs in the header. In this case, the third receiving unit 1002 terminates downloading of the second application package.

In an embodiment, the third receiving unit 1002 is further configured to receive an abstract list of the main package or an abstract list of a sub-package. The abstract list of the main package may be used for verifying the main package, or the abstract list of the sub-package may be used for verifying the sub-package, to verify whether the main package or the sub-package is tampered with. The second verification unit 1005 is configured to perform a hash operation on the downloaded main package or sub-package. If a generated abstract list of the main package or sub-package is the same as the abstract list of the main package or sub-package in the header, it indicates that the main package or sub-package is not tampered with. In this case, the second running unit 1004 decompresses the main package or sub-package, and runs the main package or sub-package based on a meta-information file in the main package. If a generated abstract list of the main package or sub-package is different from the abstract list of the main package or sub-package in the header, it indicates that an exception occurs in the main package or sub-package. In this case, the third receiving unit 1002 stops processing the main package or sub-package, and terminates downloading of the second application package.

The sub-package includes a configuration attribute, used to declare whether the sub-package depends on the main package for running. When the configuration attribute in the sub-package declares that the sub-package can run independently without depending on the main package, the sub-package is an independent sub-package. When the configuration attribute in the sub-package declares that the sub-package needs to depend on the main package for running, the sub-package is a dependent sub-package.

If the sub-package to be downloaded is a dependent sub-package, the second running unit 1004 is further configured to: before running the target sub-package, and loading the target page based on the mapping relationship between the at least one sub-package and the at least one page of the application in the at least one sub-package in the header, determine the main package based on the offset and the size that are of the sub-package in the file, and load the target sub-package based on the meta-information file in the main package.

If the sub-package to be downloaded is an independent sub-package, the second running unit 1004 may directly run the sub-package with no need to wait for completion of loading of the main package.

Figure 11A:
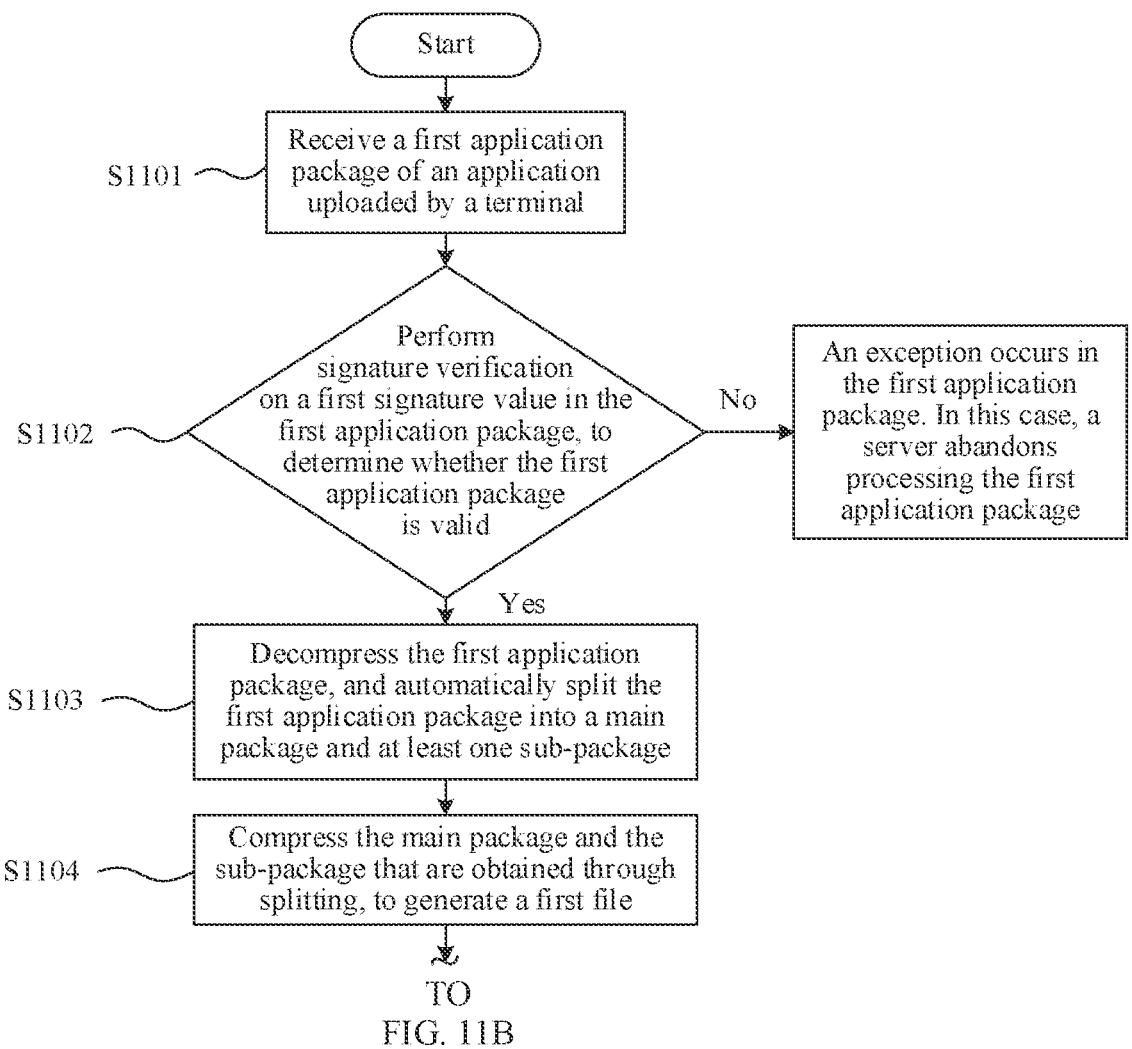
FIG. 11A and FIG. 11B are a flowchart of a server performing splitting and reassembly on an application package according to an embodiment of this application.
Figure 11B:
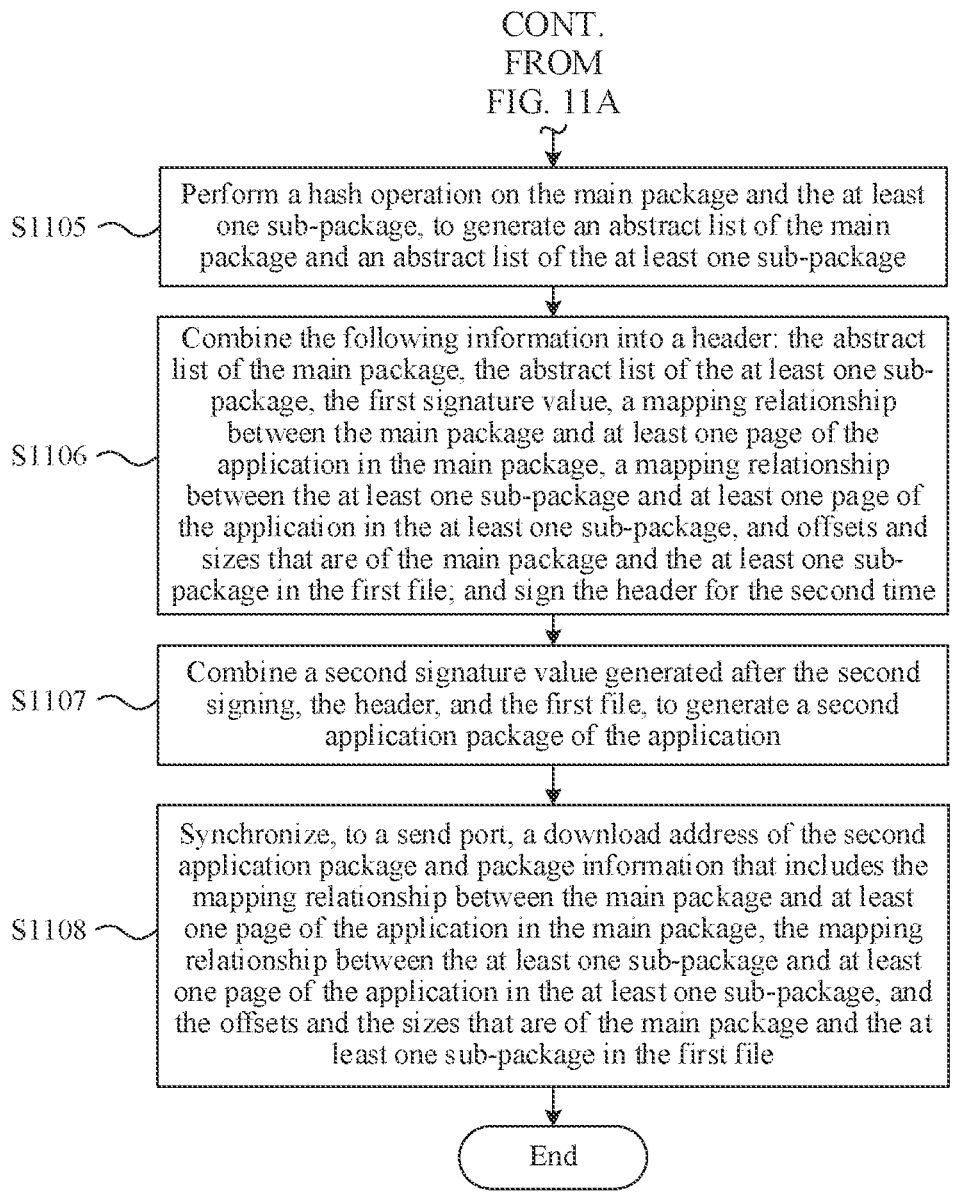

FIG. 11A and FIG. 11B are a flowchart of a server performing splitting and reassembly on an application package according to an embodiment of this application. As shown in FIG. 11A and FIG. 11B, a specific process in which a server performs splitting and reassembly on an application package is as follows.

Step S1101: The server receives a first application package of an application uploaded by a terminal.

Step S1102: Perform signature verification on a first signature value in the first application package, to determine whether the first application package is valid. If the first application package is valid, perform step S1103. If the first application package is invalid, it indicates that an exception occurs in the first application package. In this case, the server abandons processing of the first application package.

Step S1103: Decompress the first application package, and automatically split the first application package into a main package and at least one sub-package.

Step S1104: The server compresses the main package and the sub-package that are obtained through splitting, to generate a first file.

Step S1105: The server performs a hash operation on the main package and the at least one sub-package, to generate an abstract list of the main package and an abstract list of the at least one sub-package.

Step S1106: Combine the following information into a header: the abstract list of the main package, the abstract list of the at least one sub-package, the first signature value, a mapping relationship between the main package and at least one page of the application in the main package, a mapping relationship between the at least one sub-package and at least one page of the application in the at least one sub-package, and offsets and sizes that are of the main package and the at least one sub-package in the first file; and sign the header for the second time.

Step S1107: Combine a second signature value generated after the second signing, the header, and the first file, to generate a second application package of the application.

Step S1108: Synchronize, to a send port, a download address of the second application package and package information that includes the mapping relationship between the main package and the at least one page of the application in the main package, the mapping relationship between the at least one sub-package and the at least one page of the application in the at least one sub-package, and the offsets and the sizes that are of the main package and the at least one sub-package in the first file, for a client to query and download the second application package.

Figure 12:
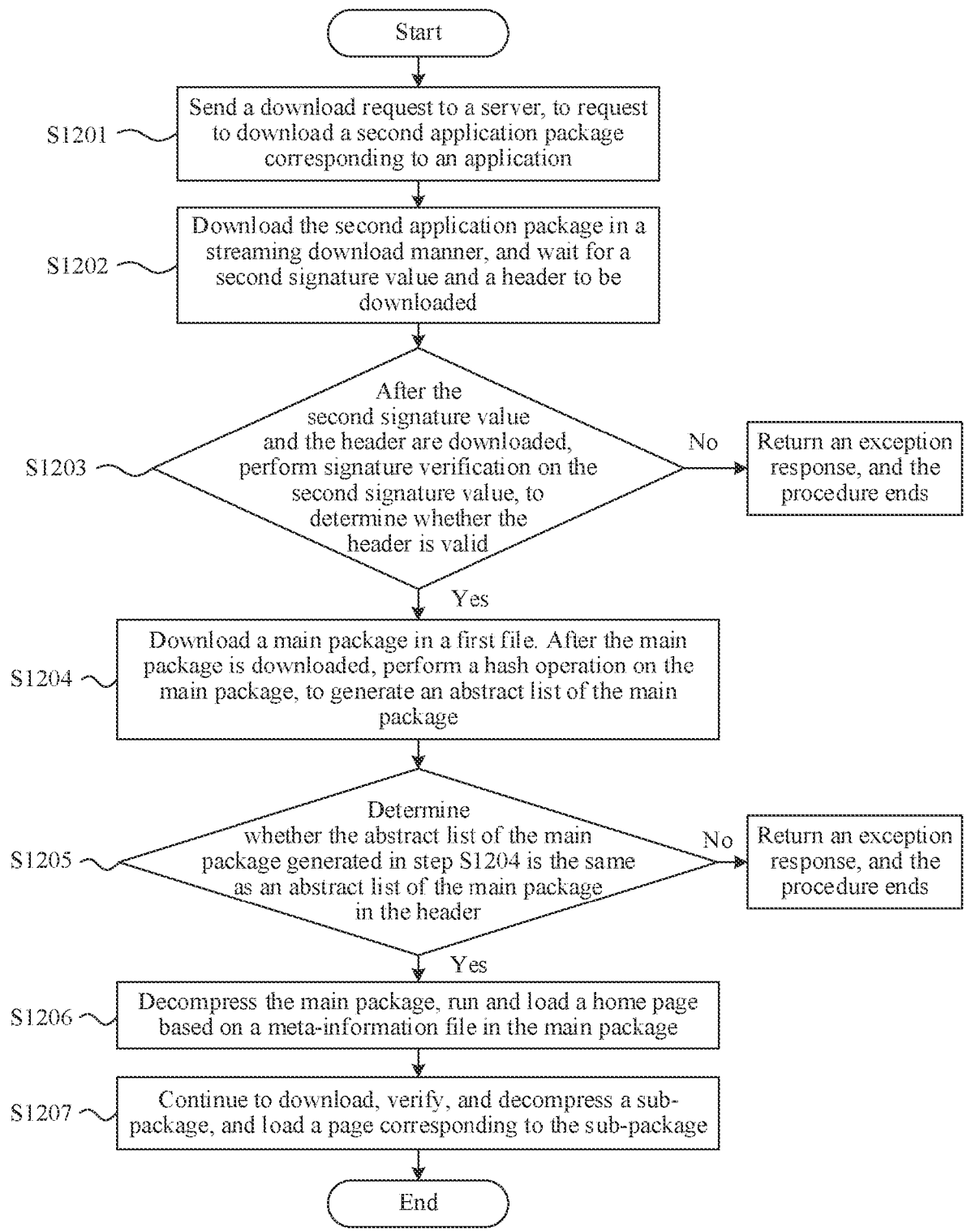
FIG. 12 is a flowchart of a client running an application package according to an embodiment of this application.

FIG. 12 is a flowchart of a client running an application package according to an embodiment of this application. As shown in FIG. 12, a specific process in which a client downloads and runs an application package is as follows.

Step S1201: Send a download request to a server, to request to download a second application package corresponding to an application.

Step S1202: Download the second application package in a streaming download manner, and wait for a second signature value and a header to be downloaded.

Step S1203: After the second signature value and the header are downloaded, perform signature verification on the second signature value, to determine whether the header is valid. When the header is valid, perform step S1204. When the header is invalid, an exception occurs in the second application package. In this case, the client no longer performs processing.

Step S1204: Download a main package in a first file. After the main package is downloaded, perform a hash operation on the main package, to generate an abstract list of the main package.

Step S1205: Compare the abstract list of the main package generated in step S1204 with an abstract list of the main package in the header, to determine whether the abstract list of the main package generated in step S1204 is the same as the abstract list of the main package in the header. If the abstract list of the main package generated in step S1204 is the same as the abstract list of the main package in the header, perform step S1206. If the abstract list of the main package generated in step S1204 is different from the abstract list of the main package in the header, an exception occurs in the main package. In this case, the client no longer performs processing.

Step S1206: Decompress the main package, and run and load a home page based on a meta-information file in the main package.

Step S1207: Continue to download, verify, and decompress a sub-package, and load a page corresponding to the sub-package.

It should be noted that one hash operation needs to be performed every time one sub-package is downloaded, then a result is compared with a hash value in the header for validity verification, and the sub-package is installed locally as a part of the entire application program only after the verification succeeds. If a user taps a specific jump link during use, and a target page is not in a local file, the client starts a thread again, to preferentially download a sub-package to which the target page belongs, and starts loading and running.

Figure 13A:
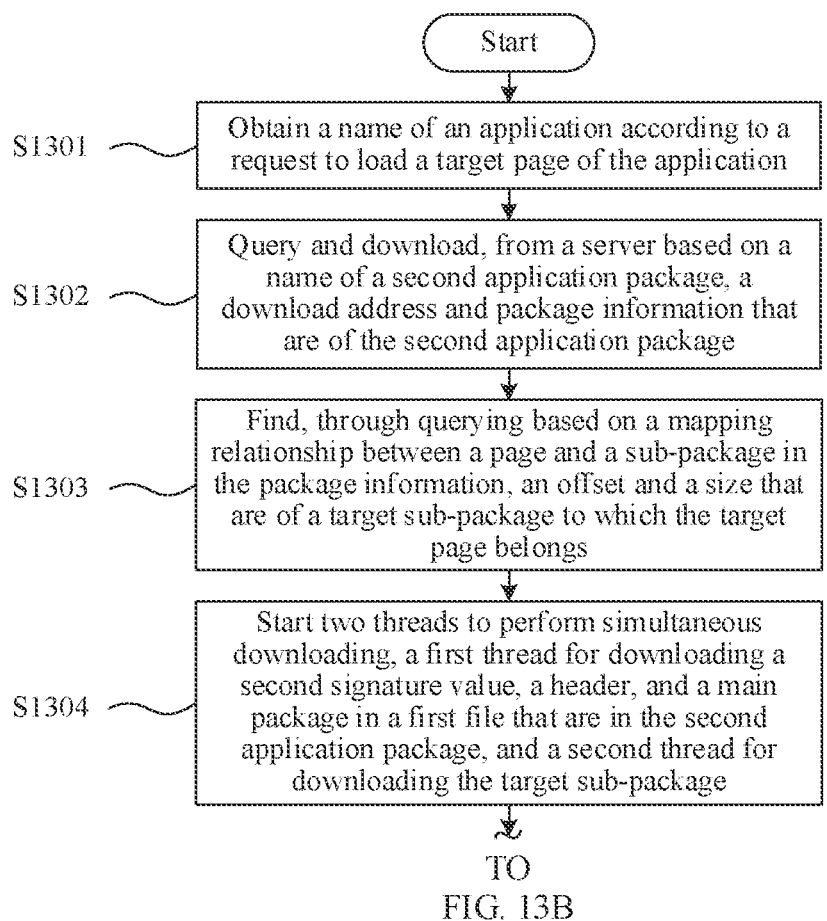
FIG. 13A and FIG. 13B are another flowchart of a client running an application package according to an embodiment of this application.
Figure 13B:
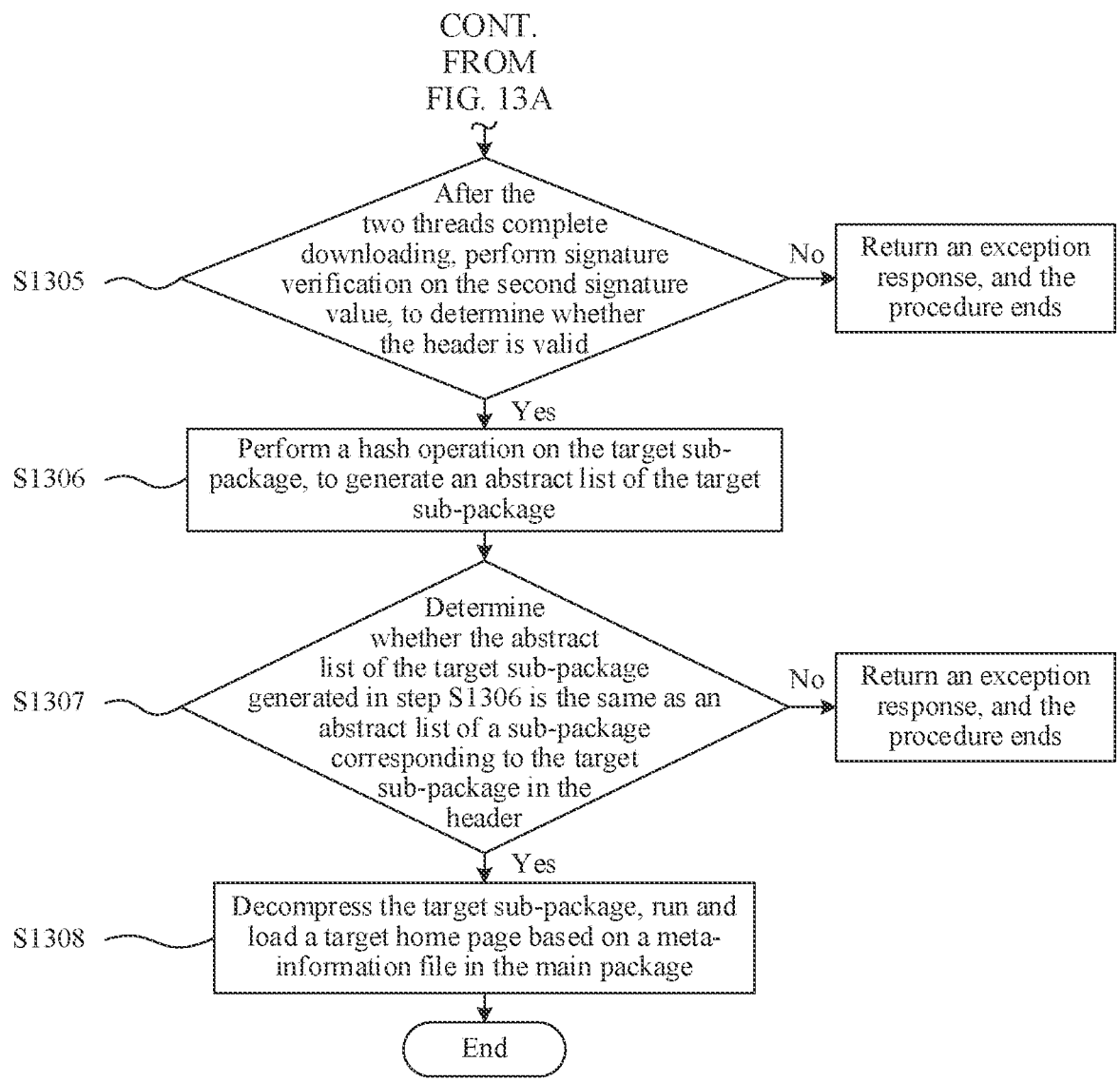

FIG. 13A and FIG. 13B are another flowchart of a client running an application package according to an embodiment of this application. As shown in FIG. 13A and FIG. 13B, in another specific embodiment, in a scenario in which a target page that a user visits is not a home page but is in a specific sub-package, a specific process in which a client downloads and runs an application package is as follows.

Step S1301: Obtain a name of an application according to a request to load a target page of the application.

Step S1302: The client queries and downloads, from a server based on a name of a second application package, a download address and package information that are of the second application package.

Step S1303: Find, through querying based on a mapping relationship between a page and a sub-package in the package information, an offset and a size that are of a target sub-package to which the target page belongs.

Step S1304: Start two threads to perform simultaneous downloading, a first thread for downloading a second signature value, a header, and a main package in a first file that are in the second application package, and a second thread for downloading the target sub-package.

Step S1305: After the two threads complete downloading, perform signature verification on the second signature value, to determine whether the header is valid. If the header is valid, perform step S1306. When the header is invalid, an exception occurs in the second application package. In this case, the client no longer performs processing.

Step S1306: Perform a hash operation on the target sub-package, to generate an abstract list of the target sub-package.

Step S1307: Compare the abstract list of the target sub-package generated in step S1306 with an abstract list of a sub-package corresponding to the target sub-package in the header, to determine whether the abstract list of the target sub-package generated in step S1306 is the same as the abstract list of the sub-package corresponding to the target sub-package in the header. If the abstract list of the target sub-package generated in step S1306 is the same as the abstract list of the sub-package corresponding to the target sub-package in the header, perform step S1308. If the abstract list of the target sub-package generated in step S1306 is different from the abstract list of the sub-package corresponding to the target sub-package in the header, an exception occurs in the target sub-package. In this case, the client no longer performs processing.

Step S1308: Decompress the target sub-package, run and load the target home page based on a meta-information file in the main package.

The embodiments of this application provide the package splitting and reassembly method performed on the server. After receiving the original application package, the server automatically performs splitting and reassembly on the original application package, to generate a complete new application package. In this way, the developer does not need to perform splitting or maintain a sub-package obtained through splitting, thereby reducing development costs of the developer. In addition, in a reassembly process, the main package and the plurality of sub-packages that are obtained through splitting are combined into one file. When performing downloading, the client only needs to send one download request to download the complete application package.

In a process of downloading the new application package, network connecting is performed once. After downloading the header and the main package, the client runs the main package. The server combines, into one file, the main package and the plurality of sub-packages that are obtained through splitting. Therefore, after the main package is downloaded, a subsequent sub-package can be downloaded without requiring network connecting to the server to be performed again. In this way, it is implemented that the client only needs to perform network connecting once to download the entire new application package, thereby effectively reducing a download time.

If a target page visited by the client is in a sub-package, the client needs to obtain a mapping relationship between a page and a sub-package, and an offset and a size that are of the sub-package in a file, where the mapping relationship, the offset, and the size are obtained through a send port of the server, and then the client can find, by query, the target sub-package corresponding to the target page. After downloading the target sub-package, a header, and a main package, the client may run the target sub-package and load the target page. In this way, a download and running time of the target page can be minimized, thereby ensuring user experience.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A computer-implemented method, comprising:
   receiving a first application package corresponding to an application;
   splitting the first application package into a main package and a sub-package, wherein the main package comprises a first page of the main package, and wherein the sub-package comprises a second page of the sub-package;
   storing the main package and the sub-package in a first file;
   generating a second application package corresponding to the application, wherein the second application package comprises a header and the first file, and wherein the header comprises a first mapping relationship between the main package and the first page of the main package, a second mapping relationship between the sub-package and the second page of the sub-package, a first offset of the main package within the first file, a first size of the main package within the first file, a second offset of the sub-package within the first file, and a second size of the sub-package within the first file;
   performing a hash operation on the main package and the sub-package, to generate a first abstract list of the main package for the main package and a second abstract list of the sub-package for the sub-package, wherein the first abstract list verifies the main package, wherein the second abstract list verifies the sub-package, and wherein generating the second application package comprises writing the first abstract list and the second abstract list into the header and signing the header; and
   synchronizing, to a send port, a download address of the second application package and package information, wherein the package information comprises the first mapping relationship, the second mapping relationship, the first offset, the first size, the second offset, and the second size.

2. The computer-implemented method of claim 1, wherein the main package comprises a meta-information file, and wherein the meta-information file runs the main package and the sub-package.

3. The computer-implemented method of claim 1, wherein the sub-package comprises a first sub-package, wherein the first sub-package comprises a configuration attribute, and wherein the configuration attribute declares whether the first sub-package depends on the main package for running.

4. The computer-implemented method of claim 3, wherein the main package comprises a capability open-up set, and wherein the capability open-up set obtains a meta-information file by the sub-package that depends on the main package.

5. The computer-implemented method of claim 1, wherein the first application package corresponds to a chat application.

6. The computer-implemented method of claim 1, wherein the first application package corresponds to an ANDROID operating system.

7. The computer-implemented method of claim 1, wherein the computer-implemented method is implemented by a server, and wherein the server comprises a content management system.

8. The computer-implemented method of claim 1, wherein the computer-implemented method is implemented by a server, and wherein the server comprises a package process server.

9. The computer-implemented method of claim 1, wherein the computer-implemented method is implemented by a server, and wherein the server comprises a content delivery network.

10. The computer-implemented method of claim 1, wherein the main package comprises a first file size that is greater than a second file size of the sub-package.

11. An apparatus, comprising:
    a memory configured to store instructions; and
    one or more processors coupled to the memory and configured to execute the instructions to:
    receive a first application package corresponding to an application;
    split the first application package into a main package and a sub-package, wherein the main package comprises a first page of the main package, and wherein the sub-package comprises a second page of the sub-package;
    store the main package and the sub-package in a first file;
    generate a second application package corresponding to the application, wherein the second application package comprises a header and the first file, and wherein the header comprises a first mapping relationship between the main package and the first page of the main package, a second mapping relationship between the sub-package and the second page of the sub-package, a first offset of the main package within the first file, a first size of the main package within the first file, a second offset of the sub-package within the first file, and a second size of the sub-package within the first file;
    perform a hash operation on the main package and the sub-package, to generate a first abstract list of the main package for the main package and a second abstract list of the sub-package for the sub-package, wherein the first abstract list verifies the main package, wherein the second abstract list verifies the sub-package, and wherein generating the second application package comprises writing the first abstract list and the second abstract list into the header and signing the header; and
    synchronize, to a send port, a download address of the second application package and package information, wherein the package information comprises the first mapping relationship, the second mapping relationship, the first offset, the first size, the second offset, and the second size.

12. The apparatus of claim 11, wherein the main package comprises a meta-information file, and wherein the meta-information file runs the main package and the sub-package.

13. The apparatus of claim 11, wherein the sub-package comprises a first sub-package, wherein the first sub-package comprises a configuration attribute, and wherein the configuration attribute declares whether the first sub-package depends on the main package for running.

14. The apparatus of claim 13, wherein the main package comprises a capability open-up set, and wherein the capability open-up set obtains a meta-information file by the sub-package that depends on the main package.

15. The apparatus of claim 11, wherein the first application package corresponds to a chat application.

16. A computer program product comprising instructions stored on a non-transitory computer-readable medium that, when execute by one or more processors, cause an apparatus to:
    receive a first application package corresponding to an application;
    split the first application package into a main package and a sub-package, wherein the main package comprises a first page of the main package, and wherein the sub-package comprises a second page of the sub-package;
store the main package and the sub-package in a first file;
generate a second application package corresponding to the application, wherein the second application package comprises a header and the first file, and wherein the header comprises a first mapping relationship between the main package and the first page of the main package, a second mapping relationship between the sub-package and the second page of the sub-package, a first offset of the main package within the first file, a first size of the main package within the first file, a second offset of the sub-package within the first file, and a second size of the sub-package within the first file;
perform a hash operation on the main package and the sub-package, to generate a first abstract list of the main package for the main package and a second abstract list of the sub-package for the sub-package, wherein the first abstract list verifies the main package, wherein the second abstract list verifies the sub-package, and wherein generating the second application package comprises writing the first abstract list and the second abstract list into the header and signing the header; and
synchronize, to a send port, a download address of the second application package and package information, wherein the package information comprises the first mapping relationship, the second mapping relationship, the first offset, the first size, the second offset, and the second size.

* * * * *